Feb. 6, 1962 H. H. WELLBORN 3,019,585
LAWN EDGING ATTACHMENT
Filed April 7, 1958 3 Sheets-Sheet 2

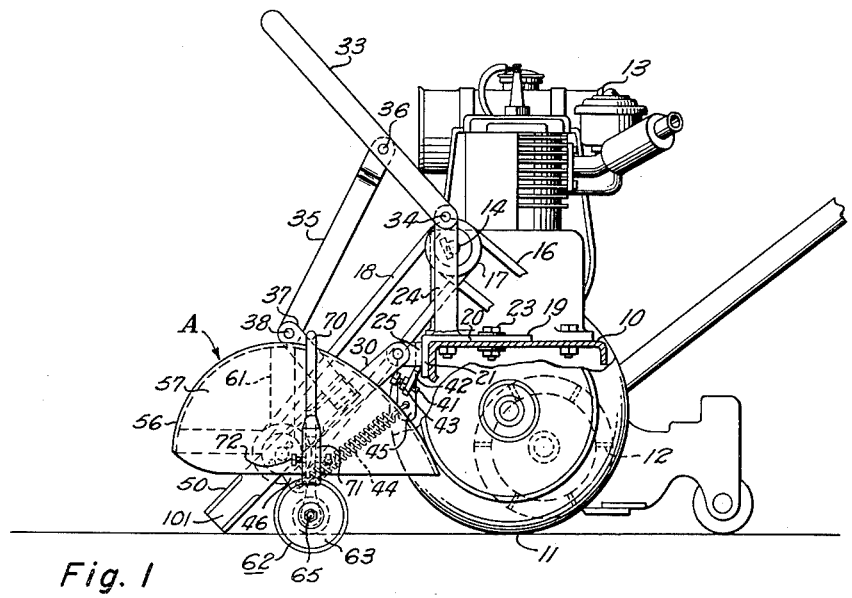

INVENTOR
Howell H. Wellborn
BY Ashley & Ashley
ATTORNEYS

Feb. 6, 1962     H. H. WELLBORN     3,019,585
LAWN EDGING ATTACHMENT
Filed April 7, 1958     3 Sheets-Sheet 3

INVENTOR
Howell H. Wellborn

BY *Ahley & Ahley*

ATTORNEYS

United States Patent Office 3,019,585
Patented Feb. 6, 1962

3,019,585
LAWN EDGING ATTACHMENT
Howell H. Wellborn, 3911 Highgrove Drive, Dallas, Tex.
Filed Apr. 7, 1958, Ser. No. 726,993
1 Claim. (Cl. 56—25.4)

This invention relates to new and useful improvements in edging attachments for power lawn mowers.

The design of a lawn edging attachment requires a power unit and a chassis. The present invention utilizes the chassis of a conventional power mower for the chassis of the edging attachment. The power unit of the mower is also used to power the edging attachment.

One object of the invention is to provide an improved edging attachment of simplified, rugged construction capable of being readily and inexpensively mounted on power lawn mowers of various manufacturers.

An important object of the invention is to provide an improved lawn edging attachment which is adapted to be pivotally supported on a power mower for swinging movement into and out of operative position forwardly and laterally of the mower and which has novel means for swinging and holding it in an elevated position when not in use whereby there is no interference with the normal operation of said mower.

A particular object of the invention is to provide an improved lawn edging attachment, of the character described, which includes a rotary cutting element adapted to be driven by the power mower and flanged guide means coacting with and supporting the cutting element contiguous the edge of a pavement.

Another object of the invention is to provide an improved lawn edging attachment, of the character described, which includes means for mounting the guide means on either side of the cutting element for supporting said element in close proximity to a curb or other pavement.

A further object of the invention is to provide an improved lawn edging attachment, of the character described, which includes a flanged roller for supporting and guiding the cutting element and resilient means for maintaining the roller and element in operative position and permitting upward pivoting thereof in the event said element strikes an obstruction.

A construction designed to carry out the invention will be hereinafter described, together with other features of the invention.

Figure 3:
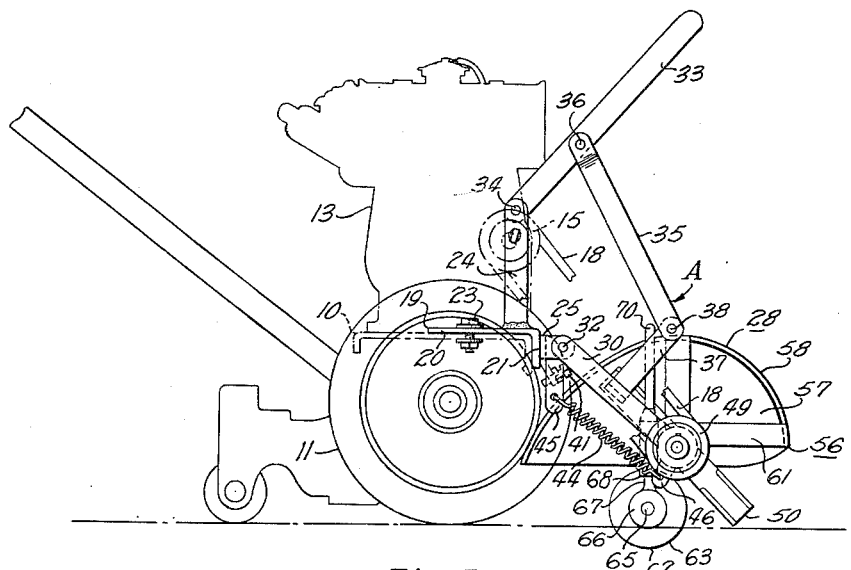
Figure 4:
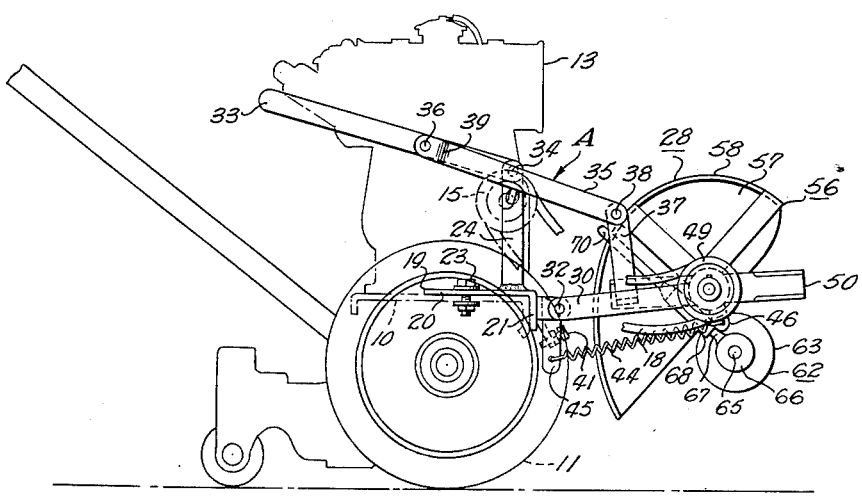
Figure 9:
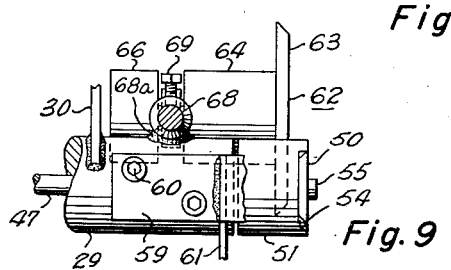
Figure 5:
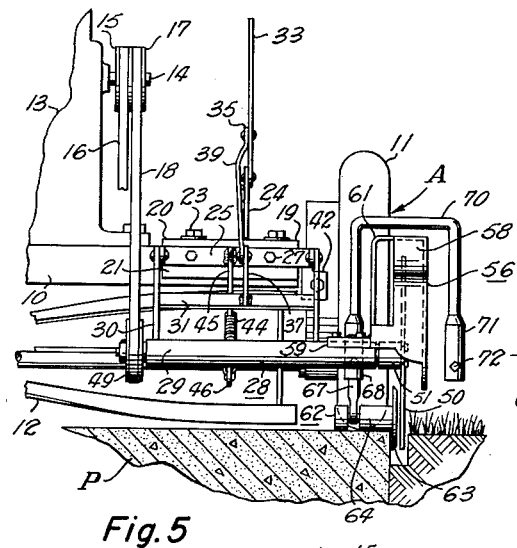
Figure 6:
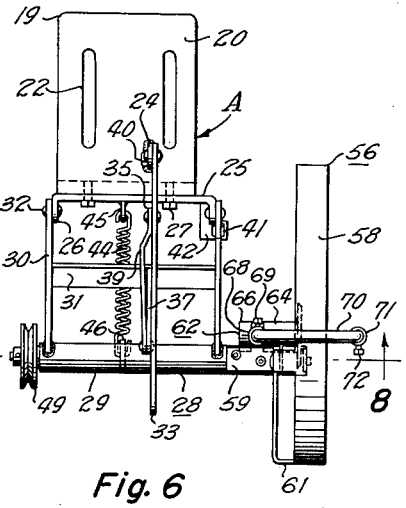
Figure 7:
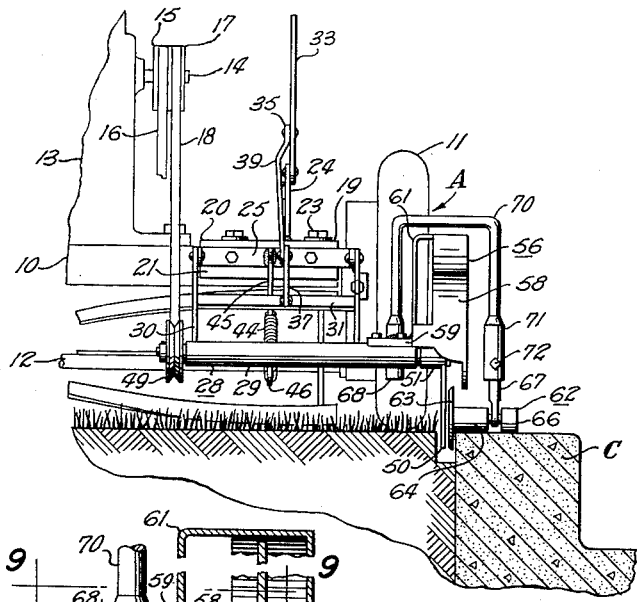
Figure 8:
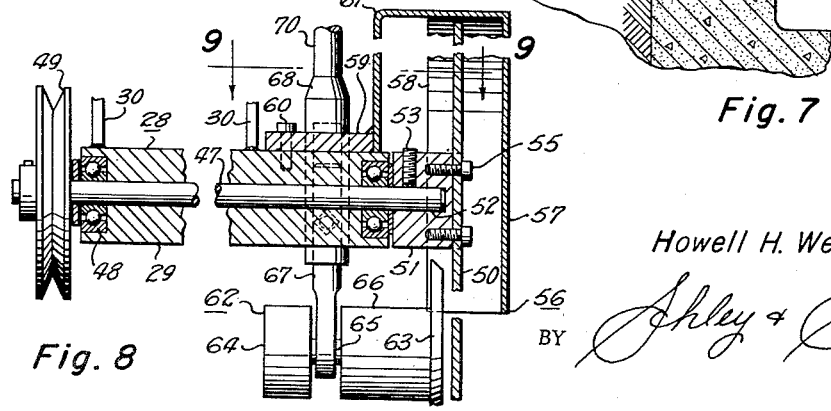

The invention will be more readily understood from a reading of the following specification and by reference to the accompanying drawings, wherein an example of the invention is shown, and wherein:

FIG. 1 is a side elevational view, partly in section, of a power lawn mower having an edging attachment, constructed in accordance with the invention, mounted thereon, FIG. 2 is an enlarged perspective view of the lawn edging attachment, FIG. 3 is an opposite side elevational view of the attachment in operative position with the mower in broken lines, FIG. 4 is a view, similar to FIG. 3, of the attachment in its elevated or inoperative position, FIG. 5 is a front elevational view of the attachment and a portion of the mower in edging relation to a pavement, FIG. 6 is a top plan view of the attachment, FIG. 7 is a view, similar to FIG. 5, showing the guide means positioned outwardly of the cutting element and in edging relation to a curb, FIG. 8 is an enlarged, transverse, vertical, sectional view, taken on the line 8—8 of FIG 6, and FIG. 9 is a horizontal, cross-sectional view, taken on the line 9—9 of FIG. 8, showing the mounting of the guide means.

In the drawings, the numeral 10 designates the top plate or platform of a conventional power lawn mower which extends longitudinally between ground wheels 11 in overlying relation to a cutting reel 12. As internal combustion engine 13 is mounted on the platform and has a drive shaft 14, pulley 15 and belt 16 for driving the wheels and reel (FIG. 5). Since the mower is of the usual construction, its details and driving arrangement are not shown. In carrying out the present invention, a second drive pulley 17 is mounted on the engine shaft 14 outwardly of the pulley 15 for receiving a second drive belt 18.

The edging attachment is indicated generally by the letter A and includes an angular mounting plate or bracket 19 which may vary in construction in accordance with the mowers of different manufacturers. As shown, the mounting plate is right angular and includes a flat base 20 extending horizontally with an upright flange or hanger 21 depending from its front end. A plurality of spaced openings or slots 22 are formed in the base for receiving bolts or other fasteners 23 to adjustably connect the plate 19 to the platform 10 with its flange overhanging the front edge of said platform (FIGS. 1–5). The base 20 has an upstanding arm or bar 24 welded 24a or otherwise secured thereto adjacent its forward end. A yoke bar or bracket 25, having widely-spaced, apertured ears or lugs 26 on its ends, extends longitudinally of the flange 21 and may be detachably fastened thereto by bolts 27 for pivotally suspending an edger 28. The latter includes a horizontal, cylindrical shaft housing 29 extending transversely and forwardly of the mower and having a pair of spaced, radial arms or bars 30 welded 30a or otherwise secured thereto and interconnected by a cross bar or brace 31 extending therebetween in parallel relation to the shaft housing (FIGS. 2 and 6). Suitable pins or rivets 32 pivotally connect the arms 30 to the lugs 26 of the yoke bar 25 so as to support the edger for swinging movement relative to the mounting plate and mower about a horizontal, transverse axis (FIGS. 3 and 4).

For imparting swinging movement to the edger 28, a lever 33 has one end pivoted to the upper end of the upright arm 24 by a pin or rivet 34 and one end of a link 35 is fastened to the intermediate portion of the lever by a pivot pin or rivet 36. An arm or bar 37 extends transversely from the brace 31 for pivotal connection to the opposite end of the link by a pin or rivet 38. It is noted that the link 35 has an offset portion 39 for clearing the upper end of the arm 24 (FIGS. 5–7) and permitting the lever 33 to swing past center and move said link past the pivot 34 for holding the edger in an elevated position (FIG. 4). With the edger in its elevated position, the mower may be operated in the usual manner. A stop lug 40 is carried by the upper portion of the upright arm for engagement by the offset link portion 39 to limit the rearward swing of the lever past center. For limiting the downward pivoting of the edger, an adjustable stop element or screw 41 is carried by an ear or lug 42 depending from one end of the yoke bar 25 for engagement by one of the arms 30 of the shaft housing 29 and may have a jam nut 43 thereon for locking it in adjusted positions.

It is preferable to pivotally mount the edger 28 on the mower to keep the cutter from plowing through raised portions of the lawn and not cutting in the lower portions of the lawn. With the arrangement (FIG. 7) it will be noted that the edger is free to move vertically with respect to the mower. The edger attachment is adapted to trim a lawn which may be several inches higher or lower than the elevation of the curbing. The attachment is adjusted to operate at a specific height by moving the base 20 to tighten the belt and then tightening the bolts 23. It would appear that the weight of the edger would be sufficient to maintain the cutter and guide assembly in contact with the curb. I, however, have found that a much improved result is achieved by supplying a helical spring 44 for resiliently urging the edger 28 downwardly into operative position. The spring has one end attached to the lower end of an upright bar or leg 45 depending from the intermediate portion of the yoke bar. The opposite end of the spring is fastened to an ear or lug 46 depending radially from the shaft housing. Manifestly, the resiliency of the spring 44 permits upward pivoting of the edger from its operative position when said edger strikes an obstruction such as a rock or the like.

As shown most clearly in FIG. 8, an axial shaft 47 is journaled in the housing 29 by ball bearings 48 recessed in the ends of said housing. The shaft is of greater length than the housing so as to project therebeyond and has a pulley 49 fixed on its inner projecting end thereof for driving connection with the second belt 18. A radial cutter element or flat blade 50 is mounted on the opposite or outer projecting end of the shaft 47 by a cylindrical hub 51 having an axial bore or socket 52 for receiving said shaft end. It is desirable to maintain the cutter 50 in a vertical position during operation to cut a groove parallel to the curb. In order to accomplish this it is necessary to maintain the mower wheels 11 at the same elevation. By positioning the cutter 50 laterally of the mower it is possible to operate both the mower wheels 11 on the same surface, i.e., on the grass or on the driveway, sidewalk, etc. This prevents the cutter blade from tilting and striking the curbing. The most desirable condition is to have a lawn completely surrounded by a sidewalk and thus the edger may be operated as shown in FIG. 5 with the mower wheels 11 on the level surface of the sidewalk. Under these conditions the cutter blade is always vertical to the face of the sidewalk and cuts an even and narrow trench. Of course the majority of lawns are at least partially bounded by curbings as shown in FIG. 7 wherein the mower is not afforded a smooth operating surface for the mower wheels. Thus it is necessary to operate the mower on the lawn.

The hub is fastened to the shaft by a set screw 53 and has a diametric groove 54 in its outer end for receiving the blade. Suitable screws 55 detachably secure the blade 50 to the hub 51 and permit reversal of said blade. The blade 50 has a first side 101 and a second side 103. The end of the shaft housing adjacent the blade is adapted to support a guard 56, which includes a substantially semi-circular side plate 57 having a peripheral flange 58 at its substantially arcuate upper margin, in surrounding relation to said blade. As overlying bracket or plate 59 is fastened to the shaft by suitable screws 60 and is connected to the flange 58 of the guard 56 by angular arms 61. As shown most clearly in FIGS. 5 and 7, the shaft and its housing are of such length that the blade and its guard are positioned slightly outward of the adjacent ground wheel 11 of the mower when the pulley 49 is alined with the pulley 17.

For guiding and supporting the blade 50 in edging relation to a walk, drive or other pavement P (FIG. 5), a flanged guide element 62 is provided for coacting with said blade. The guide element includes a circular flange or disk 63 carried by a cylindrical hub or roller 64 rotatably mounted on an axle 65 and, as shown by the numeral 66, the hub may be bifurcated or a second roller may be mounted on the axle in spaced relation to said hub (FIG. 8). An upright hanger or supporting pin 67 depends from a complementary collar or socket member 68 welded 68a or otherwise secured transversely to the rear surface of the shaft housing (FIG. 9) and has the portion of the axle 65 between the rollers or hub portions 64 and 66 journaled in its lower end. The socket member 68 carries a set screw 69 for rotatably and slidably confining the hanger 67 to adjustably support the axle below and rearwardly of the housing 29 and its shaft 47 with the disk 63 of the guide element 62 in contiguous parallel relation to the blade 50. It is noted that the disk is in sufficient proximity to the blade to provide a fixed cutting edge or member for coacting with said blade as well as guiding and positioning the same adjacent the edge of a pavement P with the rollers or hub portions riding upon said pavement. Preferably, the socket member forms a part of and is mounted on one end of an inverted, U-shaped bracket or rod 70 which straddles the blade and its guard 56 in overhanging relationship. An identical collar or socket member 71, having a set screw 72, is carried by the opposite or outer end of the bracket 70 for receiving the hanger 67 to support the guide element 62 outwardly of the blade 50. As shown in FIG. 7, the guide element is reversed so as to position its disk 63 in adjacent parallel relation to the outer side of the blade with the rollers or hub portions 64 and 66 disposed for supporting engagement with a curb C whereby the mower may be moved along the adjacent lawn. If desired, the guide element may be disposed in this position for trimming the lawn adjacent the pavement P. The overall combination of the guide, the cutter blade and the mounting means greatly increases the utility of the edging attachment by performing the following functions:

(1) The depth setting of the cutter blade is adjustable. This is accomplished by mounting the guide independent of the cutter and in a manner such that it may be moved vertically with respect to the cutter.
(2) The guide always travels in a newly formed trench and is always free to rest on the curbing instead of riding on the lawn and cutting its own path. This is accomplished by mounting the guide to the rear of the midpoint of the cutter and yet in contiguous relation therewith.
(3) The guide disk provides an edge for coaction with the cutter with a very efficient cutting action. This is accomplished by arranging the axis of the guide out of horizontal and out of vertical alignment with the axis of the cutter.
(4) The mower may be operated on the sidewalk or on the lawn as desired by the operator while the guide remains on the curbing or the sidewalk. This is accomplished by U-shaped rod 70 which allows the guide to be positioned on either side of the cutter.

From the foregoing, it is manifest that an edging attachment of simplified rugged construction which may be readily and inexpensively mounted on power lawn mowers of various manufacturers has been provided. Due to the lever 33, the edger 28 may be swung into and out of operative position and held in an elevated position whenever desired. It is noted that the upward pivoting of the edger slackens the belt 18 to break its driving connection with the pulley 49 of the shaft 47. The guide element 62 is novel and important in that it supports and guides the blade 50 in edging relation to a pavement and its disk or flange 63 provides a fixed member or edge against which the grass is cut by the rotation of said blade whereby the cutting is not dependent upon the speed of rotation. The reversible mounting of the guide element facilitates the use of the attachment in edging lawns adjacent curbs and other pavement too narrow to support the mower. Due to the wide spacing of the lugs 26 of the yoke bar 25 and the housing arms 30, a more positive and rugged support is provided for the edger.

This application is a continuation-in-part of my parent application filed August 8, 1955, Serial Number 526,838, entitled Lawn Edging Attachment.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

An attachment adapted to be connected to a power lawn mower comprising an elongated flat base having slots formed therein being adapted to receive fasteners to connect said base to said mower and having a hanger depending from one end thereof, an upstanding arm attached to said base, a yoke bar having lugs on its ends connected to said hanger, a cylindrical shaft housing extending transversely and forwardly of said yoke bar being pivotally connected thereto, a lever having one end pivotally connected to said upstanding arm and having an intermediate portion operatively associated with said cylindrical shaft housing for imparting swinging movement to said cylindrical shaft housing, an axial shaft rotatably supported by said cylindrical shaft housing having an inner end projecting beyond said cylindrical shaft housing and an outer end projecting beyond said cylindrical shaft housing, a pulley connected to said inner end adapted to be connected to a motor pulley on said mower, a radial cutter connected to said outer end, an inverted U-shaped bracket connected to said cylindrical shaft housing straddling said cutter, said U-shaped bracket having socket members on the terminal ends thereof, a guide having a hub portion and a disk portion rotatably supported on a hanger, said hanger adapted to fit within said socket members to position said hub portion and said disk portion rearward of said cutter.

References Cited in the file of this patent
UNITED STATES PATENTS

| | | |
|---|---|---|
| 1,770,434 | Schleicher | July 15, 1930 |
| 2,521,033 | Bell | Sept. 5, 1950 |
| 2,525,944 | Ralston | Oct. 17, 1950 |
| 2,602,277 | Johnson | July 8, 1952 |
| 2,626,499 | Wick | Jan. 27, 1953 |
| 2,634,667 | Woolwine | Apr. 14, 1953 |
| 2,719,400 | Lesesne | Oct. 4, 1955 |
| 2,746,227 | Tower | May 22, 1956 |
| 2,775,856 | Hoch | Jan. 1, 1957 |
| 2,798,355 | Coulter | July 9, 1957 |